(12) United States Patent
Premsankar et al.

(10) Patent No.: US 11,762,913 B2
(45) Date of Patent: Sep. 19, 2023

(54) CURSOR SEEK OPERATIONS USING DELETED RECORD SPANS

(71) Applicant: Micron Technology, Inc., Boise, ID (US)

(72) Inventors: Neelima Premsankar, Austin, TX (US); Gaurav Sanjay Ramdasi, Pune (IN); David Boles, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 247 days.

(21) Appl. No.: 16/913,432

(22) Filed: Jun. 26, 2020

(65) Prior Publication Data

US 2021/0200818 A1    Jul. 1, 2021

Related U.S. Application Data

(60) Provisional application No. 62/956,042, filed on Dec. 31, 2019.

(51) Int. Cl.
*G06F 16/903* (2019.01)
*G06F 16/901* (2019.01)

(52) U.S. Cl.
CPC .... *G06F 16/90348* (2019.01); *G06F 16/9024* (2019.01)

(58) Field of Classification Search
None
See application file for complete search history.

(56) References Cited

U.S. PATENT DOCUMENTS

| 5,687,361 | A * | 11/1997 | Sarkar | G06F 16/9014 |
| 11,030,242 | B1 * | 6/2021 | Borthakur | G06F 16/951 |
| 2014/0025899 | A1 * | 1/2014 | Dean | G06F 16/23 |
| | | | | 711/133 |
| 2018/0107728 | A1 * | 4/2018 | Gray | G06F 3/0652 |
| 2019/0205344 | A1 * | 7/2019 | Gold | G06F 16/90348 |
| 2019/0347211 | A1 * | 11/2019 | Bortnikov | G06F 12/1018 |
| 2019/0377815 | A1 * | 12/2019 | Karlberg | G06F 16/25 |
| 2020/0097558 | A1 * | 3/2020 | Fanghaenel | G06F 16/2246 |

OTHER PUBLICATIONS

Sarkar et al, "Lethe: A Tunable Delete-Aware LSM Engine", SIGMOD '20, Jun. 14-19, 2020, Portland, OR, USA, ACM ISBN 978-1-4503-6735-6/20/06. https://doi.org/10.1145/3318464. 3389757, 16 pages. (Year: 2020).*
Rumble et al, "Log-structured Memory for DRAM-based Storage", USENIX Association, 12th USENIX Conference on File and Storage Technologies, Feb. 17-20, 2014 Santa Clara, CA USA, ISBN 978-1-931971-08-9, 17 pages. (Year: 2014).*

* cited by examiner

*Primary Examiner* — Uyen T Le

(74) *Attorney, Agent, or Firm* — Lowenstein Sandler LLP

(57) ABSTRACT

An example method of cursor seek operations using deleted record spans in memory sub-systems comprises: receiving, by a processing device, a request to search for a first data element of a key-value data store, the request specifying a first key associated with the first data element; determining that the first key is within a range of deleted data elements comprising a plurality of deleted data elements of the key-value data store; identifying a tail key associated with a tail element of the range of deleted data elements; identifying a second data element in the key-value data store, wherein the second data element is associated with a second key that follows the tail key in a specified order of keys; and providing the second data element in response to the request.

20 Claims, 7 Drawing Sheets describes tombstone spans within the context of LSM trees, however, aspects of the present disclosure can be similarly applied to other types of data structures or data stores.

CURSOR SEEK OPERATIONS USING DELETED RECORD SPANS

REFERENCE TO RELATED APPLICATION

This application claims the benefit of U.S. Provisional Patent Application No. 62/956,042, filed Dec. 31, 2019, the entirety of which is incorporated herein by reference.

TECHNICAL FIELD

The present disclosure generally relates to a memory sub-system, and more specifically, relates to cursor seek operations using deleted record spans for memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
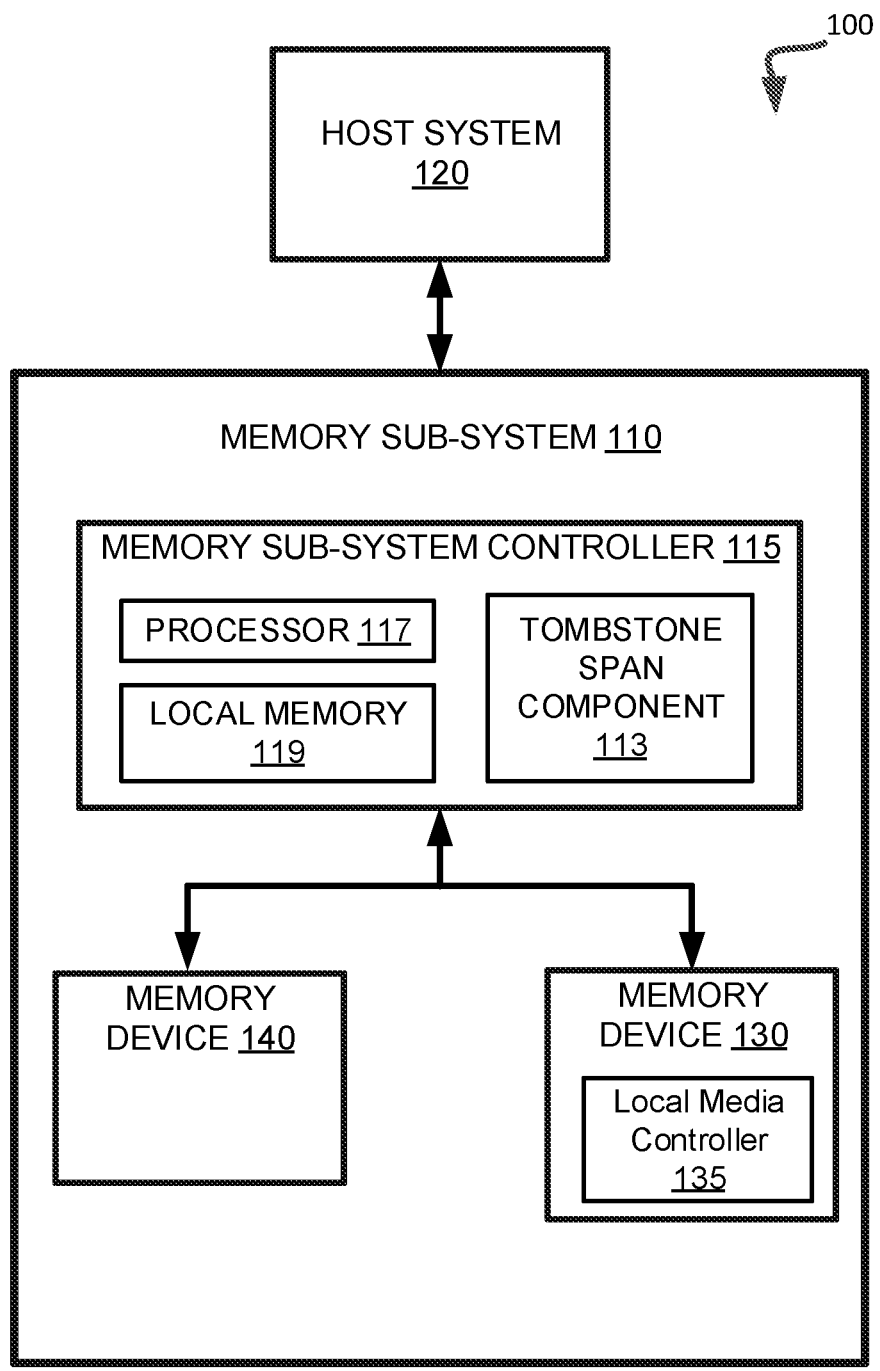
FIG. 1 illustrates an example computing system that includes a memory sub-system in accordance with some embodiments of the present disclosure.

Aspects of the present disclosure are directed to cursor seek operations using deleted record spans in memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can store key-value data structures that are optimized for memory devices used as persistent storage. In key-value storage systems, a key is a unique identifier for a data item referenced by the key and referred to as a value. Some conventional memory sub-systems implement log-based structures such as log structured merge (LSM) trees for implementations that incorporate high volume write operations and that expect efficient data access. Conventional LSM implementations do not typically update or delete records in place. An update operation inserts a new data record (a key and a value) along with a timestamp. A delete operation inserts a deletion marker, which can be provided by a key record without any data that indicates that a value corresponding to the key has been deleted. This marker is typically referred to as a "tombstone."

Typically, a tombstone can be represented in the LSM data store as a key entry and no value-block space will be consumed for this key-value pair. The purpose of the tombstone is to mark the deletion of the value while avoiding the possibly expensive operation of purging the value from the tree. In such instances, when a temporally ordered search encounters a tombstone, this indicates that the corresponding value has been deleted even if an older version of the key-value pair resides at another location (e.g., in association with an older timestamp) within the tree.

Conventional memory sub-systems configured in this manner can employ maintenance operations in key-value stores such as a "range delete" operation, which deletes records within a specified range of keys. A range delete operation can create a database cursor, which is a control structure that enables traversal over the records in a database. Cursors can facilitate subsequent additional processing such as retrieval, addition and removal of database records. The range delete can then identify the minimum key within the range, delete the first record that it finds, update the cursor to reflect deletion of the record, seek again to the minimum key within the range, delete the record it then finds, and so on. This process can continue until all records within the specified range of keys have been deleted. Each iteration of the range delete operation performs a delete operation for a particular record, which typically inserts a new tombstone record. The tombstone record will be iterated over and discarded during the next cursor seek invoked to find the next valid record, which can significantly increase the complexity of the operation overall. Additionally, the increased complexity can result in significant increases in processing resources involved in identifying valid data among spans of deleted data since each tombstone record in the span of deleted data is analyzed sequentially.

Aspects of the present disclosure address the above and other deficiencies by implementing accelerated cursor seek operations using tombstone record spans in memory sub-systems. A tombstone span component operating in accordance with aspects of the present disclosure can identify and track lexicographically contiguous ranges of deleted data elements (e.g., a series of tombstones that are in an ordered sequence) referred to as "tombstone spans." The tombstone span can be used by any cursor seek operation that seeks to a key within a known tombstone span. The seek operation can skip the contiguous tombstones, eliminating the need to merge and iterate over them, and the tombstone span can return the lexicographically largest key in the tombstone span (e.g., the end of the tombstone span). This, in turn, accelerates the seek operation to identify the first valid data element that follows the span of tombstones lexicographically in the data store.

Advantages of the present disclosure include, but are not limited to, significantly improved performance of cursor seek operations for LSM key-value data stores in a memory sub-system. Implementing the tombstone span component of the present disclosure allows a cursor to utilize the tombstone span during seek operations to reduce the number of tombstones processed, thereby significantly reducing the complexity of range delete operations directed to large numbers of records. Additionally, since the complexity of these operations is improved, the resource requirements for the operations is dramatically reduced, thereby improving operational performance of the memory device that incorporates the LSM key-value data store. Moreover, since the performance of the memory device is improved, the performance of a memory sub-system that includes the memory device also improves, since fewer memory merge operations for tombstone processing are executed across the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes negative-and (NAND) type flash memory and write-in place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system controller 115 can include tombstone span component 113 that can be used to facilitate accelerated cursor seek operations for key-value data stores in memory sub-system 110. In some embodiments, memory sub-system controller 115 can include at least a portion of tombstone span component 113. For example, the memory sub-system controller 115 can include a processor 117 (processing device) configured to execute instructions stored in local memory 119 for performing the operations described herein. In some embodiments, the tombstone span component 113 is part of the host system 120, an application, or an operating system.

The tombstone span component 113 can track contiguous sequences of tombstone keys in a key-value data store that are identified by the respective minimum and maximum keys in a lexicographic order, which is produced by sorting the keys based on the order of their symbols in a predefined alphabet. When a delete operation inserts a tombstone record into the key-value data store, that record's adjacent neighbor nodes are examined to see if the new record extends an existing tombstone span. If the new tombstone record does not extend an existing span, the tombstone span component 113 creates a new tombstone span. The new record is marked as a tombstone span head node, and as such, has its head attribute (e.g., a bit flag) set. The tombstone span head node is the lexicographic minimum of its tombstone span. This node's tombstone span pointer points to the tail node (i.e., the last node) of the span, which is the lexicographic maximum of its tombstone span. The tombstone span pointer of every other node participating in the tombstone span points to the head node.

If the tombstone record does extend a tombstone span, the tombstone span component 113 traverses from its lexicographically lesser neighbor's head pointer to the head record in the span. The pointer for the head record is updated to the new maximum member of the span.

Alternatively, a delete operation can result in merging two contiguous tombstone spans: if the keys to the right and to the left of the key being deleted belong to existing tombstone spans, the two tombstone spans can be merged to form a single contiguous tombstone span. In an illustrative example, if nodes having the keys ranging from AA to AF form a tombstone span, node having the key AG is a valid record containing data, and nodes having the keys ranging from AH to AZ form another tombstone span, and then node AG is deleted, a new tombstone span including the nodes with the keys ranging from AA to AZ can be formed (including the first tombstone span AA . . . AF, the newly inserted tombstone AG, and the second tombstone span AH . . . AZ).

An insert operation that inserts a data record (as opposed to a tombstone record), invokes the tombstone span component 113 to check its lexicographically adjacent key nodes to potentially invalidate or split a tombstone span. Further details with regards to the operations of the tombstone span component 113 are described below.

A cursor seek operation attempts to find the smallest key that is lexicographically greater than or equal to the key being searched. If the key is determined to be a part of a tombstone span, the key of the tail node of the tombstone span is identified by no more than two operations (first identifying the head node referenced by the tombstone span pointer of the identified node, and then identifying the tail node referenced by the tombstone span pointer of the head node), thus bypassing iterating over all the tombstones in a potentially long sequence of contiguous tombstones. Finally, the first valid node immediately following the tail node of the span is returned by the cursor seek operation.

FIGS. 2A-2F illustrate examples of accelerated cursor seek operations using tombstone record spans in accordance with some embodiments of the present disclosure. In some embodiments, this process can be performed by the tombstone span component 113 of FIG. 1.

Figure 2A:
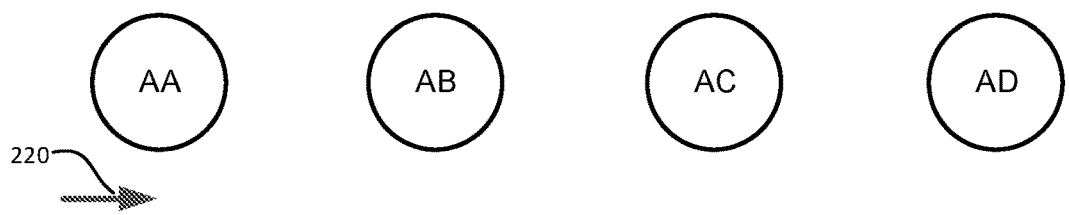
FIGS. 2A-2E illustrate examples of tombstone spans generated by delete operations in accordance with some embodiments of the present disclosure.

As shown in FIG. 2A, a key-value data store can include nodes AA, AB, AC, and AD that each includes valid data. A cursor seek operation 220 can be performed to return a node whose key is lexicographically (e.g., the next in an ordered set) greater than or equal to AA in the key-value data store. The tombstone span component 113 of FIG. 1 can be invoked to determine if there is a tombstone span present within the scope of cursor seek operation 220, and if so, whether any tombstones can be skipped to provide the first valid node whose key is lexicographically greater than or equal to AA. As shown, node AA contains valid data (e.g., is not a tombstone) so the tombstone span component can indicate that there are no tombstones that can be bypassed. The cursor seek operation 220 can then return node AA as the first available node.

In one example (e.g., in response to a node delete request or a range delete request issued by the host), after node AA is returned by the seek operation 220, the memory subsystem controller can proceed to delete node AA. Accordingly, the tombstone span component can be invoked to determine whether a tombstone span exists, and if so, can extend the identified existing span. Otherwise, the tombstone span component can generate a new tombstone span, which would be initially composed of node AA. In various examples, the tombstone span component can determine that node AA is part of a tombstone span. As noted herein above, the tombstone span pointer of every node of the tombstone span, except for the head node, points to the head node of the tombstone span. The tombstone span pointer of the head node points to the tail node (i.e., the last node) of the span, which is the lexicographic maximum of its tombstone span.

Accordingly, for a span including a single node, since that node is both the beginning and the tail of the span, the tombstone span pointer would point to the node itself. Accordingly, a tombstone span that includes only node AA can be represented by a pointer (or reference identifier, etc.) that points from node AA to node AA. In some embodiments, the tombstone span pointer, as well as other tombstone span metadata, can be stored as a part of the tombstone record. Alternatively, the tombstone span metadata can be stored in a separate data structure that maintains the keys associated with tombstone spans within the key-value data store. A tombstone span of one node is illustrated by FIG. 2B.

Figure 2B:
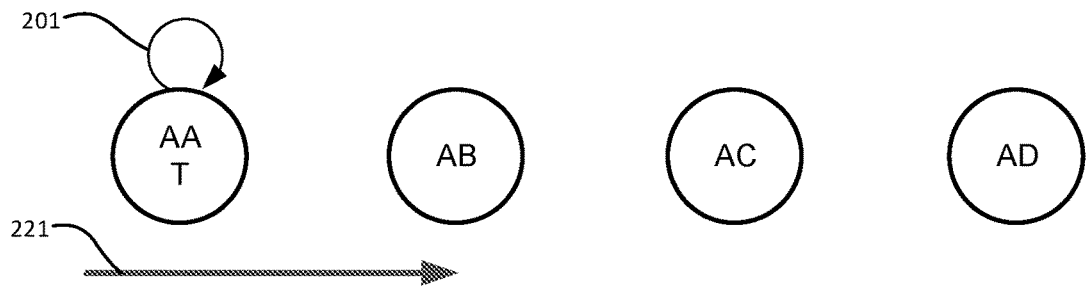

FIG. 2B illustrates a tombstone span that is generated by a delete operation performed on node AA. As shown in FIG. 2B, node AA has been deleted and a tombstone record has been generated with the key AA. For simplicity of illustration, the tombstone record is depicted by the "T" symbol in the AA node. In various embodiments, the tombstone record can be a separate record added to the key value data store with the key AA and additional metadata that indicates it is a tombstone (e.g., an indicator, a pointer, a flag, etc.). As noted above, the operation that deleted node AA invoked the tombstone span component to generate pointer 201 that associates the head node and the tail node of the span. Since AA is the only node in the span, pointer 201 points from AA to AA.

As shown in FIG. 2B, a cursor seek operation 221 can be subsequently performed. In some embodiments, cursor seek operation 221 can be performed in response to a request issued by the host to delete any node whose key is lexicographically greater than or equal to the key of node AA. As noted above, this request can be a single node delete request, a range delete request, or the like. Again, the tombstone span component can be invoked to determine whether a tombstone span is present. As shown, the cursor can begin the seek operation with node AA. The tombstone span component can then identify node AA within the key-value data store and determine that node AA is a tombstone record. The tombstone span component can then retrieve the span metadata from the tombstone span data structure (or from the tombstone record itself) to determine the scope of the tombstone span. As shown in FIG. 2B, the tombstone span includes a single node, so the span begins and ends with node AA. Accordingly, the next valid node in the key-value store should be the node whose key is lexicographically greater than the last node of the span (node AA), which in this case is node AB. The tombstone span component can subsequently identify the tail of the span using pointer 201 and the cursor seek operation returns the next node AB.

In one example, cursor seek operation 221 can be followed by a node delete request issued by the host. As noted above, cursor seek operation 221 returns node AB. The tombstone span component can subsequently extend the scope of the existing single-node span to include node AB. In such instances, the head of the span would remain AA, and the tail of the span would be AB. The tombstone span component can delete pointer 201 that points from AA to AA and generate a new pointer that points from AA to AB (linking the head of the span to the tail of the span). This resulting tombstone span structure is illustrated by FIG. 2C.

Figure 2C:
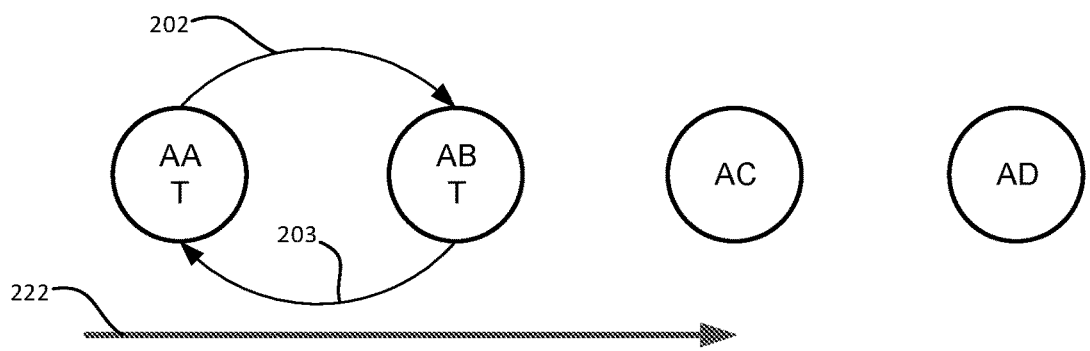

FIG. 2C illustrates a tombstone span that is generated by delete operations performed on nodes AA and AB. For example, FIG. 2C can represent the result of a delete operation that follows the cursor seek operation 221 of FIG. 2B (e.g., if operation 221 was performed in response to a request to delete a range of data that includes AA to AB). As shown in FIG. 2C, nodes AA and AB have been deleted and tombstone records have been generated with the keys AA and AB respectively (nodes illustrated with a "T"). As noted above, the operation that deleted node AB invoked the tombstone span component to generate pointer 202 that associates the head node of the span (AA) with the tail node of the span (AB). Additionally, the tombstone span component can generate pointer 203 that associates the tail node of the span (AB) with the head node of the span (AA). The tombstone span component can use these pointers to identify the tail node of the span in no more than two operations starting from any node within the span.

As shown in FIG. 2C, a cursor seek operation 222 can be subsequently performed. In some embodiments, cursor seek operation 222 can be performed in response to a request to delete any node whose key is lexicographically greater than or equal to the key of node AA. This request can be a single node delete request, a range delete request, or the like. As noted above, the tombstone span component can be invoked to determine whether a tombstone span is present and if so, whether the seek operation can be accelerated to the tail of the span. As shown, the cursor can begin the seek operation with node AA. The tombstone span component can then identify node AA within the key-value data store and determine that node AA is a tombstone record. The tombstone span component can then retrieve the span metadata from the tombstone span data structure (or from the tombstone record itself) to determine the scope of the tombstone span. As shown in FIG. 2C, the tombstone span begins at AA and ends at AB based on pointer 202. Accordingly, the next valid node in the key-value store should be the node whose key is lexicographically greater than the last tombstone of the tombstone span (node AB), which in this case is node AC. The tombstone span component can use the pointer 202 to identify the tail of the span and the cursor seek operation returns the next node AC. The cursor can bypass merge operations that would otherwise be involved in identifying the tombstone records between AA and AB, thereby accelerating the return of AC.

In one example, cursor seek operation 222 can be issued in response to a range delete request issued by the host. In such instances, the cursor seek operation 222 is followed by a node delete request for node AC. The tombstone span component can subsequently extend the scope of the span to include node AC. In such instances, the head of the span would remain AA, and the tail of the span would be AC. The tombstone span component can delete pointer 202 that points from AA to AB and generate a new pointer that points from AA to AC (linking the head of the span to the new tail of the span). This resulting tombstone span structure is illustrated by FIG. 2D.

Figure 2D:
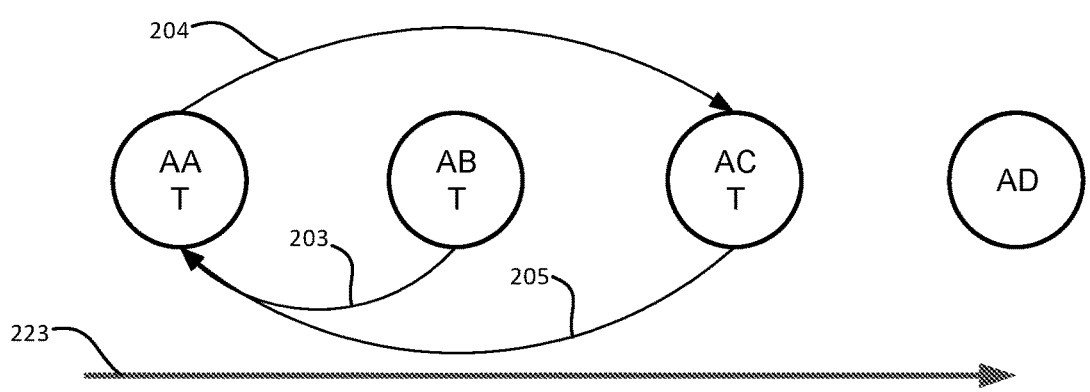

FIG. 2D illustrates a tombstone span that is generated by delete operations performed on nodes AA to AC. For example, FIG. 2D can represent the result of a delete operation that follows the cursor seek operation 222 of FIG. 2C (e.g., if operation 222 was performed in response to a request to delete a range of data that includes AA to AC). As shown in FIG. 2D, nodes AA to AC have been deleted and tombstone records have been generated with the keys AA, AB, and AC respectively (nodes illustrated with a "T"). As noted above, the node delete request following operation 222 of FIG. 2C invoked the tombstone span component to generate pointer 204 that associates the head node of the span (AA) with the tail node of the span (AC). Additionally, the tombstone span component can generate another pointer 205 that associates the tail node of the span (AC) with the head node of the span (AA). Notably, pointer 203 that associates node AB with the head of the span (AA) remains in place. In some embodiments, an additional pointer is generated to associate node AB with the tail of the span (AC). Alternatively, no additional pointer is generated to associate node AB with the tail of the span. The tombstone span component can use these pointers to determine the end of a span in the fewest number operations based when receiving information about any node within the span. For example, if no pointer is generated that associates AB with the tail of the span, the tombstone span component can identify the tail of the span by using pointers 203 and 204 in combination.

As shown in FIG. 2D, a cursor seek operation 223 can be subsequently performed. In some embodiments, cursor seek operation 223 can be performed in response to a request to delete any node whose key is lexicographically greater than or equal to the key of node AA. This request can be a single node delete request, a range delete request, or the like. As noted above, the tombstone span component can be invoked to determine whether a tombstone span is present and if so, whether the seek operation can be accelerated to the tail of the span. As shown, the cursor can begin the seek operation with node AA. The tombstone span component can then identify node AA within the key-value data store and determine that node AA is a tombstone record. The tombstone span component can then retrieve the span metadata from the tombstone span data structure (or from the tombstone record itself) to determine the scope of the tombstone span. As shown in FIG. 2D, the tombstone span begins at AA and ends at AC based on pointer 204. Accordingly, the next valid node in the key-value store should be the node whose key is lexicographically greater than the last tombstone of the tombstone span (node AC), which in this case is node AD. The tombstone span component can use the pointer 204 to identify the tail of the span and the cursor seek operation returns the next node AD. The cursor can bypass merge operations that would otherwise be involved in identifying the tombstone records between AA and AC, thereby accelerating the return of AD.

In one example, operation 223 can be performed in response to a range delete request issued by the host. In such instances, operation 223 is followed by a delete request for node AD. The tombstone span component can subsequently extend the scope of the span to include node AD. In such instances, the head of the span would remain AA, and the tail of the span would be AD. The tombstone span component can delete pointer 204 that points from AA to AC and generate a new pointer that points from AA to AD (linking the head of the span to the new tail of the span). This resulting tombstone span structure is illustrated by FIG. 2E.

Figure 2E:
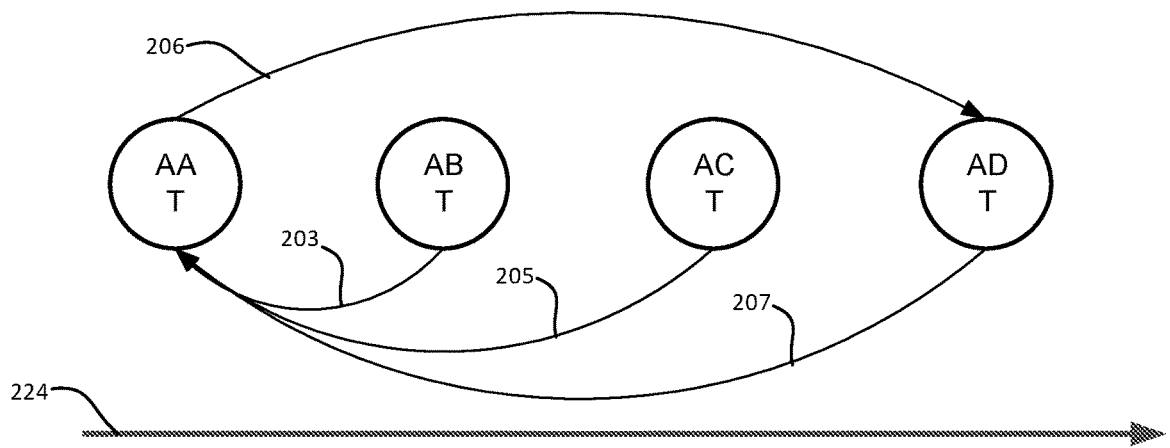

FIG. 2E illustrates a tombstone span that is generated by delete operations performed on nodes AA to AD. For example, FIG. 2E can represent the result of a delete operation that follows the cursor seek operation 223 of FIG. 2D (e.g., if operation 223 was performed in response to a request to delete a range of data that includes AA to AD). As shown in FIG. 2E, nodes AA to AD have been deleted and tombstone records have been generated with the keys AA, AB, AC, and AD respectively (nodes illustrated with a "T"). As noted above, the operation that deleted node AD invoked the tombstone span component to generate pointer 206 that associates the head node of the span (AA) with the tail node of the span (AD). Additionally, the tombstone span component can generate another pointer 207 that associates the tail node of the span (AD) with the head node of the span (AA). Notably, pointers 203 (that associates node AB with node AA) and 205 (that associates node AC with node AA) remain in place.

As shown in FIG. 2E, a cursor seek operation 224 can be subsequently performed. In some embodiments, cursor seek operation 224 can be performed in response to a request issued by the host to delete any node whose key is lexicographically greater than or equal to the key of node AA. This request can be a single node delete request, a range delete request, or the like. As noted above, the tombstone span component can be invoked to determine whether a tombstone span is present and if so, whether the seek operation can be accelerated to the tail of the span. As shown, the cursor can begin the seek operation with node AA. The tombstone span component can then identify node AA within the key-value data store and determine that node AA is a tombstone record. The tombstone span component can then retrieve the span metadata from the tombstone span data structure (or from the tombstone record itself) to determine the scope of the tombstone span. As shown in FIG. 2E, the tombstone span begins at AA and ends at AD based on pointer 206. Accordingly, the next valid node in the key-value store should be the node whose key is lexicographically greater than the last tombstone of the tombstone span (node AD), which in this case is any node immediately following node AD (not pictured). The tombstone span component can use the pointer 206 to identify the tail of the span and the cursor can return the node following AD. The cursor can bypass merge operations that would otherwise be involved in identifying the tombstone records between AA and AD, thereby accelerating the return of the next node with valid data (e.g., that is not a tombstone node).

The examples illustrated in FIGS. 2A-2E have been described in relation to delete operations. In various embodiments, the tombstone span component can also be invoked to accelerate read and write operations as well as delete operations. Notably, read operations should not result in any additional extension of a tombstone span since no additional valid data nodes should be deleted as a result of a read (which would not generate any new tombstone nodes). In some embodiments, a write operation could be received that results in the addition/insert of a valid data node within the key range encompassed by a tombstone span. This is illustrated below with respect to FIG. 2F.

Figure 2F:
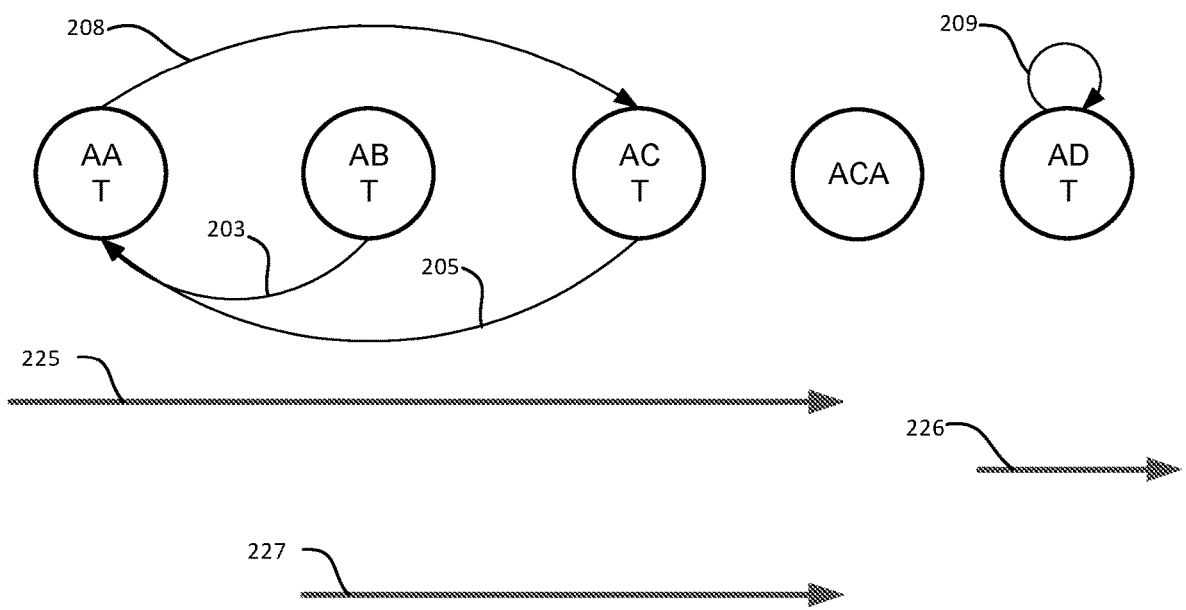
FIG. 2F illustrates an example of a tombstone span that is split by an insert operation in accordance with some embodiments of the present disclosure.

FIG. 2F illustrates a tombstone span that is split as a result of an insert operation. For example, FIG. 2F can represent the result of an insert operation performed on the key-value data store depicted in FIG. 2E. As shown above in FIG. 2E, nodes AA to AD have been deleted and tombstone records have been generated with the keys AA, AB, AC, and AD respectively (nodes illustrated with a "T"). As shown in FIG. 2F, an insert operation 225 can be subsequently received to insert data for node ACA. The tombstone span component can be invoked to determine whether a tombstone span is associated with the key-value range that would include the new node, and if so, whether the span is to be updated as a result of the data insert. As shown, the tombstone span can use the tombstone span structure information to determine that the new node would be inserted lexicographically between tombstone nodes AC and AD. The tombstone span component can then modify the tombstone span metadata to split the original span (tombstone node AA to tombstone node AD) into two separate spans on either side of valid data node ACA.

As noted herein above, the tombstone span pointer of every node of the tombstone span, except for the head node, points to the head node of the tombstone span. The tombstone span pointer of the head node points to the tail node (i.e., the last node) of the span, which is the lexicographic maximum of its tombstone span. Accordingly, the tombstone span component can delete the pointer 206 that associates the head of the span (tombstone node AA) with the previous tail of the span (tombstone node AD), as well as the pointer 207 that associates the current tail of the span with the head of the span. The tombstone span component can then determine, based on the location of the newly added valid data node ACA that the new tail of the span is now node AC. Subsequently, the tombstone span component can generate a new pointer 208 that associates the head of the span (AA) with the new tail of the span (AC). Similarly, the tombstone span component can generate a new span that begins with tombstone node AD. As shown in FIG. 2E, tombstone node AD was the end of the previous span, so the tombstone span component can generate a new pointer 209 that marks tombstone node AD as the beginning and ending of the new span. In other embodiments where the original span included additional nodes after AD, the tombstone span component could rebuild the pointers for the subsequent nodes to indicate that tombstone node AD would be the new head of that tombstone span. For example, if the original span also included nodes AE and AF (not shown in FIG. 2F), the tombstone span component would generate a pointer that associates AD with the tail of the span (AF). Additionally, the tombstone span component would delete any pointers that associated nodes AE and AF with AA (the beginning of the previous span) and generate new pointers for both AE and AF that associate those nodes with AD (the beginning of the new span after the split).

In some embodiments, a similar process can be performed if a tombstone node that is part of a tombstone span is replaced with a node that includes valid data. In such instances, the tombstone span would be split using a similar process to that described above. For example, returning to the tombstone span depicted in FIG. 2E, if the tombstone node AB is replaced with a record with the key AB that includes valid data, the tombstone span data structure would be updated so that any reference to AB would be removed (since node AB would no longer be a tombstone), and splitting the AA to AD span into two spans (one span including only AA, and a second span that includes AC and AD). Subsequently, the pointers for the original span would be modified to account for the two new spans. The AA span would be a span with a single node (AA) with a pointer that indicated that AA is the beginning and ending of that span. Pointers 206, 203, 205, and 207 would all be deleted. Additionally, the span metadata would be updated to indicate that tombstone AC is the beginning of a new span and tombstone AD is the end of that span. New pointers would be generated to indicate the new span structure.

As shown in FIG. 2F, a cursor seek operation 225 can be subsequently performed. In some embodiments, cursor seek operation 225 can be performed in response to a request to return any node whose key is lexicographically greater than or equal to the key of node AA. This request can be followed by a single node delete request, performed as part of a range delete request, or the like. The request can also be followed by a read operation, an insert operation, etc. The tombstone span component can be invoked as described above to determine whether a tombstone span is present and if so, whether the seek operation can be accelerated to the tail of the span. As shown, the tombstone span component can identify the updated tombstone span, and can use pointer 208 to identify the tail of the span and return the next node with valid data (node ACA).

Similarly, a cursor seek operation 226 can be subsequently performed. In some embodiments, cursor seek operation 226 can be performed in response to a request to return any node whose key is lexicographically greater than or equal to the key of node AD. This request can be followed by a single node delete request, performed as part of a range delete request, or the like. The request can also be followed by a read operation, an insert operation, etc. The tombstone span component can be invoked as described above to determine whether a tombstone span is present and if so, whether the seek operation can be accelerated to the tail of the span. As shown, the tombstone span component can identify the newly created tombstone span, and can use pointer 209 to identify the tail of the span and return the next node with valid data (any node immediately following tombstone node AD).

In some embodiments, cursor seek operation 227 can be subsequently performed in response to a request to return any node whose key is lexicographically greater than or equal to the key of a node within a tombstone span (rather than greater than a node within a span). For example, cursor seek operation 227 can be a request to return a node whose key is lexicographically greater than or equal to the key of node AB (within the span, but not the head of the span). The tombstone span component can be invoked as described above to determine whether a tombstone span is present and if so, whether the seek operation can be accelerated to the tail of the span.

As shown, the tombstone span component can identify node AB (the starting node for the seek operation 227) and determine whether node AB is part of a tombstone span. The tombstone span component first determines that AB is a tombstone node (illustrated with a "T"). The tombstone span component then uses the tombstone span structure (or information from the tombstone node AB itself) to determine the tail of the span. To do so, the tombstone span component determines whether AB is the head of the span. As shown, it is not the head of the span, so the tombstone span component uses pointer 203 to identify node AA as the head of the span. The tombstone span component then uses pointer 208 to identify the tail of the span and return node ACA.

Figure 3:
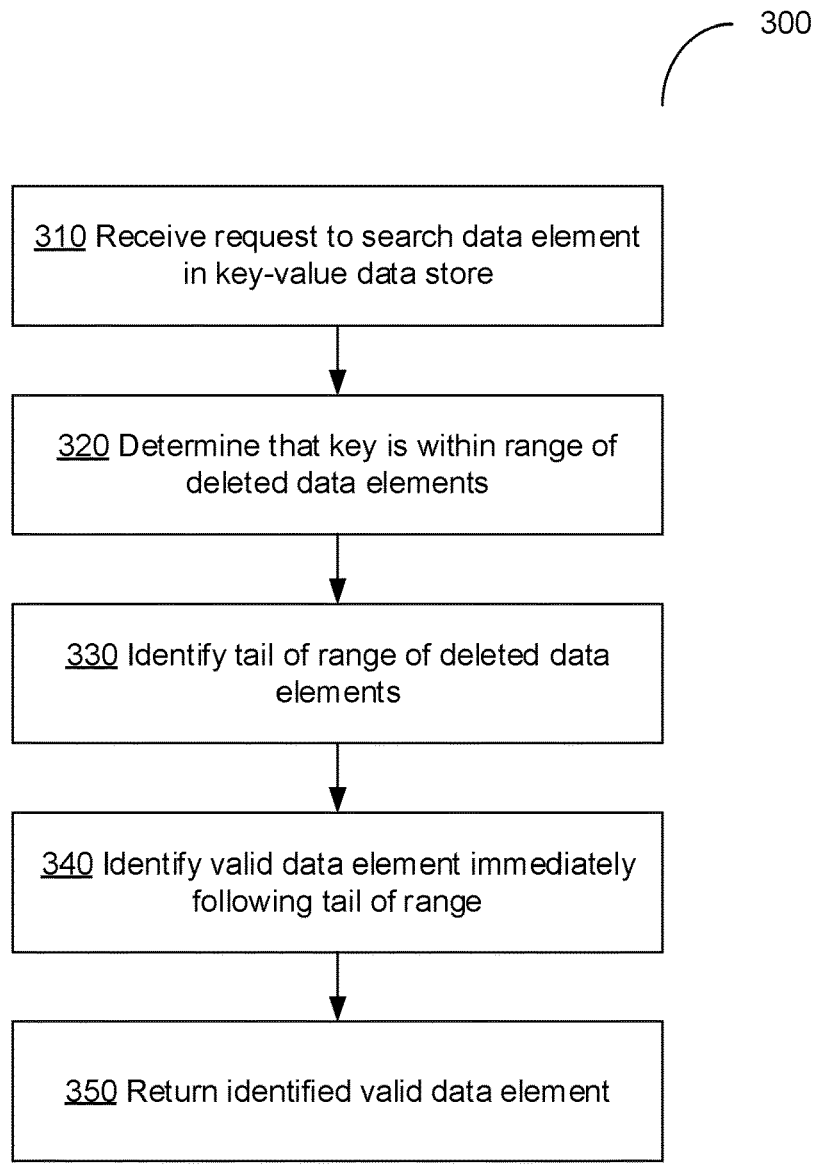
FIG. 3 is a flow diagram of an example method of performing a cursor seek operation using deleted record spans, in accordance with aspects of the present disclosure.

FIG. 3 is a flow diagram of an example method of searching a data element in a key-value data store, in accordance with aspects of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the tombstone span component 113 of FIG. 1. As noted herein above, the functions of the tombstone span component 113 can be performed by the memory sub-system controller 115 or by the local media controller 135 of FIG. 1. In other embodiments, the method 300 is performed by the host system 120 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 310, the processing device implementing the method receives a request to search for a data element of a key-value data store. The request can specify the key of the data element.

At operation 320, the processing device determines that the specified key is found within a range of deleted data elements (also referred to herein above as "tombstone span").

At operation 330, the processing device identifies the key associated with the tail data element of the range of deleted data elements. As noted herein above, every data element of the range of deleted data element includes a pointer, which, in case of all data elements of the range, except for the head data element, points to the head data element of the range, while the pointer of the head data element points to the tail data element (i.e., the last data element) of the range. Accordingly, in order to identify the tail data element, the processing device first identifies the head data element of the range as the data element which is referenced by the pointer of the data element identified by the key specified by the request, and then identifies the tail data element of the range as the data element referenced by the pointer of the head data element.

At operation 340, the processing device identifies the first valid data element that immediately follows the tail data element in the lexicographic order of the keys.

At operation 350, the processing device providing the identified first valid data element in response to the request, and the method terminates.

Figure 4:
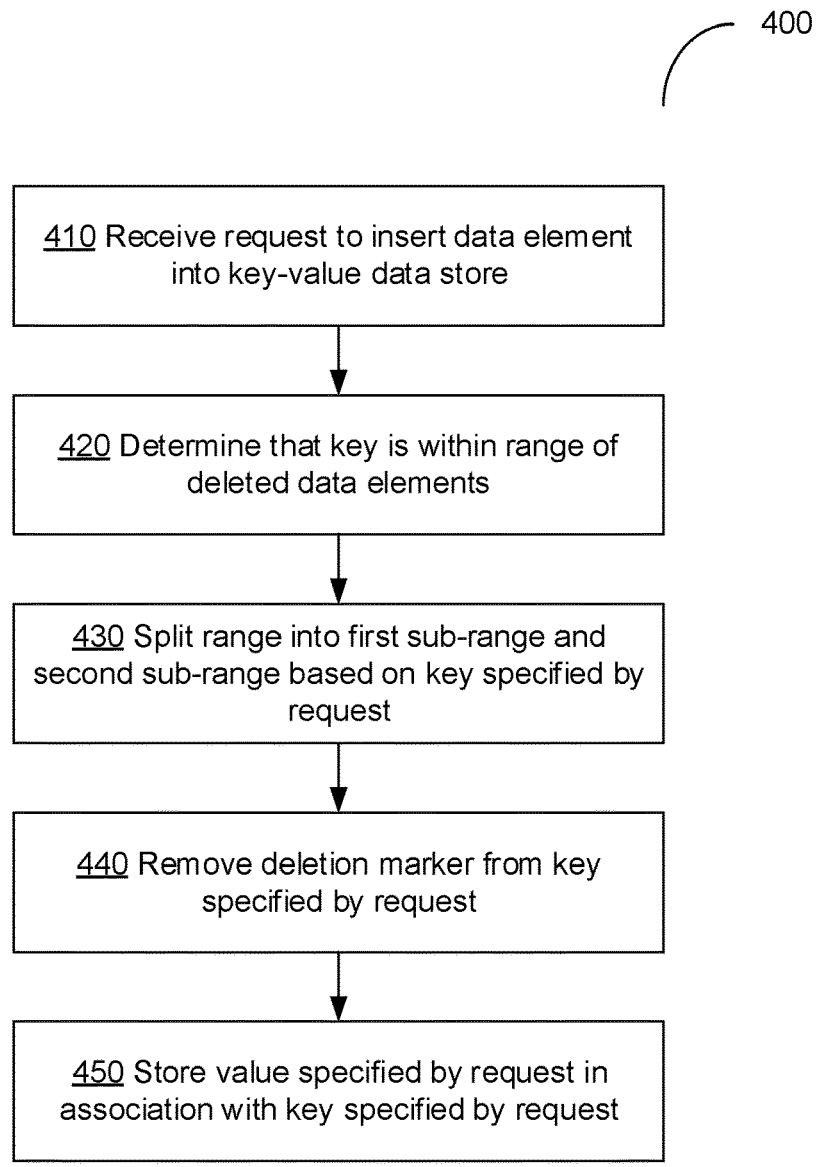
FIG. 4 is a flow diagram of an example method of inserting a data element in a key-value data store, in accordance with aspects of the present disclosure.

FIG. 4 is a flow diagram of an example method of inserting a data element in a key-value data store, in accordance with aspects of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the tombstone span component 114 of FIG. 1. As noted herein above, the functions of the tombstone span component 114 can be performed by the memory sub-system controller 115 or by the local media controller 145 of FIG. 1. In other embodiments, the method 400 is performed by the host system 120 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 410, the processing device implementing the method receives a request to insert a data element into a key-value data store. The request can specify the key and the value of the data element.

At operation 420, the processing device determines that the specified key is found within a range of deleted data elements.

At operation 430, the processing device splits the range of deleted data elements into two sub-ranges divided by the data element specified by the insert request. In an illustrative example, in order to split the range of deleted data elements, the processing device sets the pointer of the head element of the range of deleted data elements to reference the tail data element of the first sub-range of the deleted data elements, which is the data element that has a key that immediately precedes, in the lexicographical order of keys, the key of the data element specified by the request. Then, the processing device identifies the head data element of the second sub-range of deleted data elements, which is the data element that has the key which immediately follows, in the lexicographical order of keys, the key of the data element specified by the request, and sets the pointer of the identified data element to reference the tail element of the range of deleted data elements. Finally, the processing device sets the pointers of the data elements to reference the head data element of the second sub-range of deleted data elements.

At operation 440, the processing device removes a deletion marker from the data element referenced by the key specified by the insert request.

At operation 450, the processing device stores, in the key-value data store, the value specified by the request in association with the key specified by the request, and the method terminates.

Figure 5:
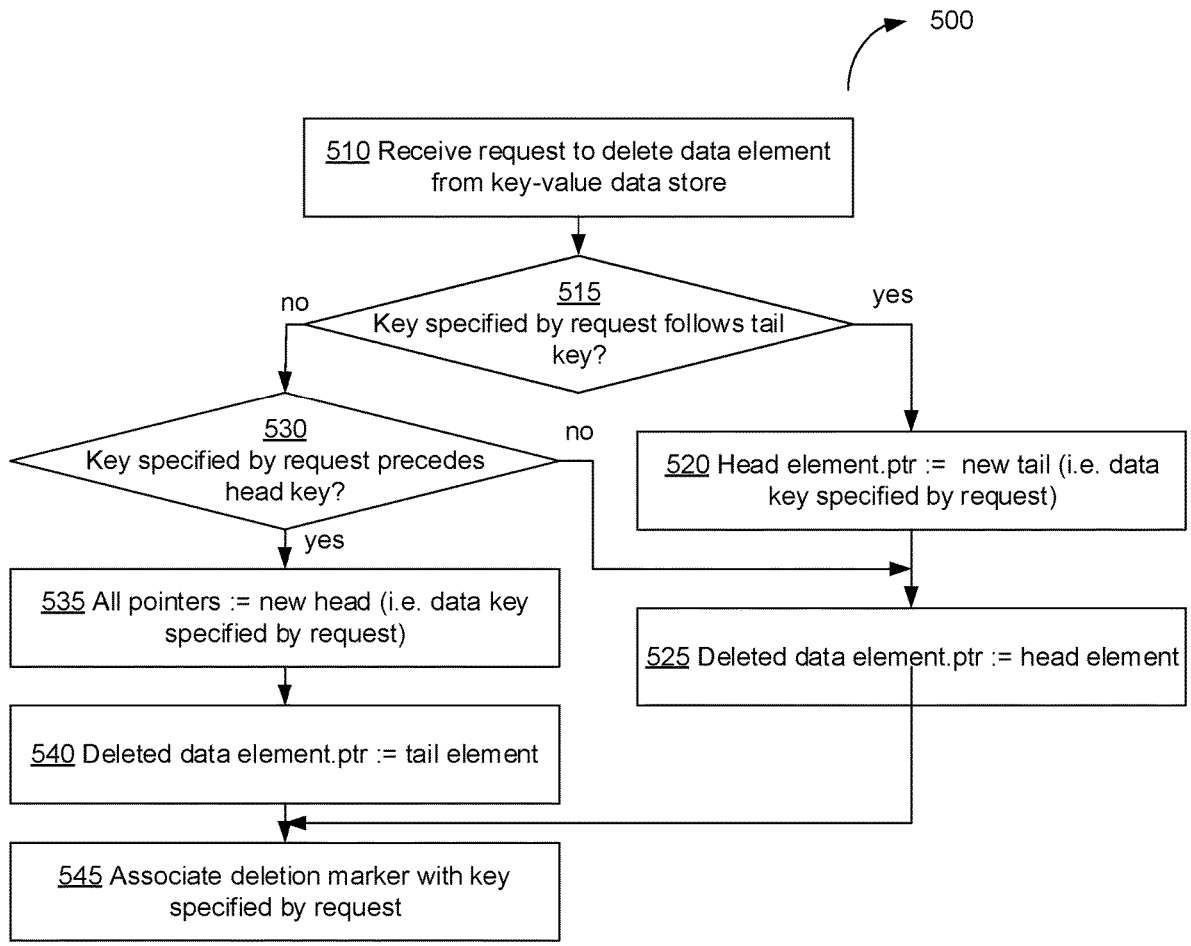
FIG. 5 is a flow diagram of an example method of deleting a data element from a key-value data store, in accordance with aspects of the present disclosure.

FIG. 5 is a flow diagram of an example method of deleting a data element from a key-value data store, in accordance with aspects of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the tombstone span component 115 of FIG. 1. As noted herein above, the functions of the tombstone span component 115 can be performed by the memory sub-system controller 115 or by the local media controller 155 of FIG. 1. In other embodiments, the method 500 is performed by the host system 120 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 510, the processing device implementing the method receives a request to delete a data element from a key-value data store. The request can specify the key of the data element.

Responsive to determining, at operation 515, that the specified key immediately follows the tail key of the range in the lexicographic order of the keys, the processing continues at operation 520 to extend the range of deleted data elements by including the data element specified by the request, which becomes the new tail element of the range; otherwise, the method branches to operation 545.

As noted herein above, every data element of the range of deleted data element includes a pointer, which, in case of all data elements of the range, except for the head data element, points to the head data element of the range, while the pointer of the head data element points to the tail data element (i.e., the last data element) of the range. Accordingly, at operation 520, the processing device modifies the pointer of the head element of the range of deleted data elements to reference the data element to be deleted.

At operation 525, the processing device sets the pointer of the data element to be deleted to reference the head element of the range of deleted data elements, and the processing continues at operation 545.

Responsive to determining, at operation 530, that the specified key immediately precedes the head key of the range in the lexicographic order of the keys, the processing continues at operation 535 to extend the range of deleted data elements by including the data element specified by the request, which becomes the new head elements of the range; otherwise, the method branches to operation 525.

At operation 535, the processing device modifies the pointers of all elements of the range of deleted elements to reference the data element to be deleted.

At operation 540, the processing device sets the pointer of the data element to be deleted to reference the tail element of the range of deleted data elements.

At operation 545, the processing device associates a deletion marker with the data element specified by the request, and the method terminates.

Figure 6:
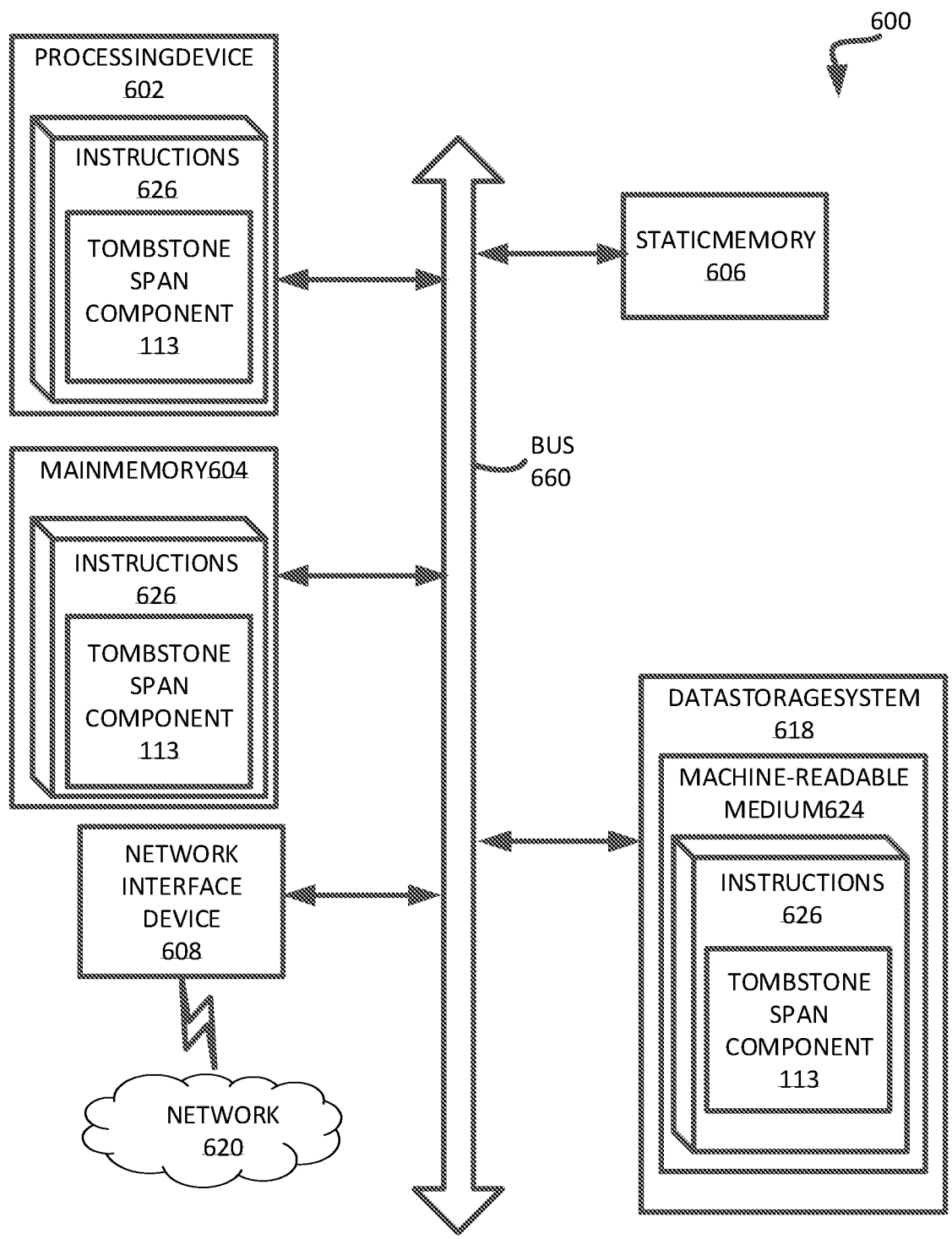
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to tombstone span component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 460.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a tombstone span component (e.g., the tombstone span component 113 of FIG. 1). While the machine-readable storage medium 324 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, by a processing device, a request for a data element identified by any key that is lexicographically greater than or equal to a first key specified by the request;
   determining that the first key is within a range of deleted data elements of a key-value data store;
   identifying a tail key associated with a tail element of the range of deleted data elements;
   performing a cursor seek operation by identifying, in the key-value data store, the data element identified by a second key that immediately follows the tail key in a specified order of keys; and
   providing the data element in response to the request.

2. The method of claim 1, wherein at least one deleted data element of the range of deleted data elements comprises a pointer referencing a head element of the range of deleted data elements.

3. The method of claim 1, wherein at least one deleted data element of the range of deleted data elements comprises a pointer referencing the tail element of the range of deleted data elements.

4. The method of claim 1, wherein keys of a plurality of data elements of the range of deleted data elements are lexicographically ordered.

5. The method of claim 1, wherein identifying the tail key associated with the tail element of the range of deleted data elements further comprises:
   identifying a head element of the range of deleted data elements, wherein the head element is referenced by the first key; and
   identifying the tail element of the range of deleted data elements, wherein the tail element is referenced by a second pointer of the head element.

6. The method of claim 5, wherein a head flag of the head element is set to a first value.

7. The method of claim 1, further comprising:
   receiving a request to delete the data element;
   modifying a first pointer of a head element of the range of deleted data elements to reference the data element;
   setting a second pointer of the data element to reference the head element of the range of deleted data elements; and
   associating a deletion marker with the data element.

8. A computer-readable non-transitory storage medium comprising executable instructions that, when executed by a processing device, cause the processing device to:

receiving, by a processing device, a request for a data element identified by any key that is lexicographically greater than or equal to a first key specified by the request;

determining that the first key is within a range of deleted data elements of a key-value data store;

performing a cursor seek operation by identifying a tail key associated with a tail element of the range of deleted data elements;

identifying, in the key-value data store, the data element identified by a second key that immediately follows the tail key in a specified order of keys; and providing the data element in response to the request.

9. The computer-readable non-transitory storage medium of claim 8, wherein at least one deleted data element of the range of deleted data elements comprises a pointer referencing a head element of the range of deleted data elements.

10. The computer-readable non-transitory storage medium of claim 8, wherein at least one deleted data element of the range of deleted data elements comprises a pointer referencing the tail element of the range of deleted data elements.

11. The computer-readable non-transitory storage medium of claim 8, wherein keys of a plurality of data elements of the range of deleted data elements are lexicographically ordered.

12. The computer-readable non-transitory storage medium of claim 8, wherein identifying the tail key associated with the tail element of the range of deleted data elements further comprises:

identifying a head element of the range of deleted data elements, wherein the head element is referenced by the first key; and identifying the tail element of the range of deleted data elements, wherein the tail element is referenced by a second pointer of the head element.

13. The computer-readable non-transitory storage medium of claim 12, wherein a head flag of the head element is set to a first value.

14. A system, comprising:

a memory device to store a key-value data store; and a processing device, operatively coupled to the memory device, the processing device to perform operations comprising:

receiving a request for a data element identified by any key that is lexicographically greater than or equal to a first key specified by the request;

determining that the first key is within a range of deleted data elements of a key-value data store;

identifying a tail key associated with a tail element of the range of deleted data elements;

performing a cursor seek operation by identifying, in the key-value data store, the data element identified by a second key that immediately follows the tail key in a specified order of keys; and providing the data element in response to the request.

15. The system of claim 14, wherein at least one deleted data element of the range of deleted data elements comprises a pointer referencing a head element of the range of deleted data elements.

16. The system of claim 14, wherein at least one deleted data element of the range of deleted data elements comprises a pointer referencing the tail element of the range of deleted data elements.

17. The system of claim 14, wherein keys of a plurality of data elements of the range of deleted data elements are lexicographically ordered.

18. The system of claim 14, wherein identifying the tail key associated with the tail element of the range of deleted data elements further comprises:

identifying a head element of the range of deleted data elements, wherein the head element is referenced by a first pointer of the first data element; and identifying the tail element of the range of deleted data elements, wherein the tail element is referenced by a second pointer of the head element.

19. The system of claim 18, wherein a head flag of the head element is set to a first value.

20. The system of claim 14, wherein the operations further comprise:

receiving a request to delete the data element;

modifying a first pointer of a head element of the range of deleted data elements to reference the data element;

associating a second pointer of the data element to reference the head element of the range of deleted data elements; and associating a deletion marker with the data element.

* * * * *